United States Patent
Zhang

(10) Patent No.: US 12,423,123 B2
(45) Date of Patent: Sep. 23, 2025

(54) METHOD AND INTERFACE FOR EMBEDDED HELP IN COMPUTERS AND OTHER ELECTRONIC DEVICES

(75) Inventor: Xuezhi Zhang, Guangzhou (CN)

(73) Assignee: Xuezhi Zhang, Guangzhou (CN)

( * ) Notice: Subject to any disclaimer, the term of this patent is extended or adjusted under 35 U.S.C. 154(b) by 0 days.

(21) Appl. No.: 12/762,298

(22) Filed: Apr. 16, 2010

(65) Prior Publication Data

US 2010/0274743 A1    Oct. 28, 2010

(30) Foreign Application Priority Data

Apr. 22, 2009  (CN) .......................... 200910038860.3

(51) Int. Cl.
*G06F 9/45*    (2006.01)
*G06F 9/451*   (2018.01)

(52) U.S. Cl.
CPC .................................. *G06F 9/453* (2018.02)

(58) Field of Classification Search
CPC ....................................................... G06F 9/453
USPC ....................................................... 706/62, 11
See application file for complete search history.

(56) References Cited

U.S. PATENT DOCUMENTS

| | | | | |
|---|---|---|---|---|
| 6,148,241 | A * | 11/2000 | Ludtke | G05B 19/0426 700/83 |
| 7,636,887 | B1 * | 12/2009 | Kinnucan, Jr. | |
| 2004/0002959 | A1 * | 1/2004 | Alpert | G06F 16/951 |

FOREIGN PATENT DOCUMENTS

CN    1782995 A    6/2006

OTHER PUBLICATIONS

Fok et al ("A Lightweight Coordination Middleware for Mobile Computing" 2004).*
Dworman et al ("Helping Users to use Help: Improving Interaction with Help Systems" 2004).*
Trevor Grayling ("If We Build it, Will They Come? A Usability Test of Two Browser-based Embedded Help Systems" 2002).*
Daniel Humberg (iManual—Context-Aware Mobile Help Systems Mar. 2004).*
Sukaviriya et al ("Automatic Generation of Textual, Audio, and Animated Help in UIDE: The User Interface Design Environment" 1994).*
Lieberman et al ("A goal-oriented interface to consumer electronics using planning and commonsense reasoning" 2007) (Year: 2007).*

* cited by examiner

*Primary Examiner* — Lut Wong

(57) ABSTRACT

A method and related software enable users to obtain intelligent and pertinent operation guides and/or help according to a user's operational situations and/or a document state or a working status of electronic appliances without resorting to a user manual or a help system, thereby providing an intelligent human-machine interface, thus augmenting greatly the ease of use for computers and other electronic appliances.

14 Claims, 6 Drawing Sheets

METHOD AND INTERFACE FOR EMBEDDED HELP IN COMPUTERS AND OTHER ELECTRONIC DEVICES

CROSS REFERENCE TO RELATED APPLICATIONS

The current application claims

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The field of present invention includes communication interfaces between humans and machines.

Communication between human and computers or other electronic appliances is realized by commands. Commands for computers are invoked by mouse clicking on commands, command buttons or command icons in a menu, toolbar and/or dialog boxes etc. of computer software or by short-cut key strokes. Commands for other electronic appliances are effectuated by selecting commands, command buttons or command icons in a menu, toolbar and/or dialog box, etc. of the software for the appliance or by pressing buttons on a keyboard for the appliance.

Among commands for computers or other electronic appliances, some are executed immediately once invoked and are easy to use; while others are conditional, they can be invoked and executed only when certain conditions are satisfied or after some other commands have been executed. These commands are here called conditional commands. Conditional commands are difficult to use and often require training or consulting manuals. Those keyboard buttons for electronic appliances, which can be activated only when certain conditions are satisfied, are here called conditional buttons.

In software for computers or other electronic appliances, these conditional commands are updated by a command update system in the software. If conditions for their execution are satisfied, they are activated and can be invoked to execute; otherwise they are "grayed" or de-activated and prevented from being invoked. Conditional buttons on electronic appliance keyboards cannot be de-activated and are always operable, but it will cause no action if pressed down when conditions for their execution are not satisfied. These operational paradigms greatly increase the difficulty of using computers and other electronic appliances. Beginners have to seek help from user manuals or from a help system and find their operational procedures inside vast amount of information. They might not be always successful and this causes some difficulty for the general public.

BRIEF SUMMARY

Conventionally, the treatment of conditional commands and conditional buttons greatly increases the difficulty of using computers and other electronic appliances. Embodiments of the current invention provide a different operational paradigm for conditional commands and conditional buttons by embedding conditional test for the command, intelligent operation guides and/or help which are dependent on a document state and/or a user's operational situations and conditional test or status checks for different situations inside conditional commands or conditional buttons so that users can directly obtain pertinent help according to their operation stages when needed without having to consult a user manual or a help system.

DETAILED DESCRIPTION

Embodiments of the invention provide a human-machine interface with embedded help.

In software embodiments for computers and other electronic appliances, conditional commands are not updated by a command update system and are always activated and invokable. The commands are instead embedded with conditional test for execution of the command and various intelligent operation guides and/or help which are dependent on a document state and/or a user's operational situations as well as a conditional test or status check for different situations if there are more than one situations. When a user invokes a conditional command, if the conditions for its execution are not satisfied, the conditions to satisfy and the related operation steps for satisfying the conditions are displayed. Further, operation guides pertinent to the current operational situation are provided based on examination of the state of the current document and/or the user's current operational situation or stage. If the conditions for its execution are satisfied, the conditional command is executed directly without displaying any help or operation guides.

Figure 1:
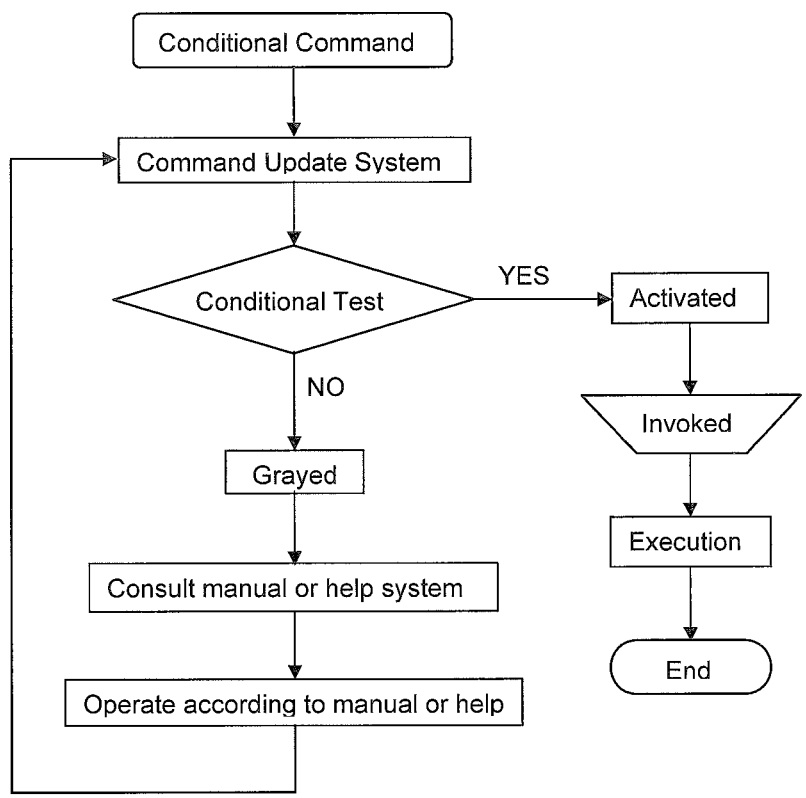
FIG. 1 is the flow chart for conditional commands according to an embodiment of the invention.

This approach not only eliminates the need to update the conditional command and therefore speed up program execution and reduces use of computer resources, but also provides pertinent description, operation guide and/or help according to user's operational situation when they are needed. This help is provided according to the document state and/or the user's operational situation; it will not be provided if the user is familiar with the operation of the conditional command and proceeds in the correct manner as opposed to annoying tips which frequently pop-up even if not needed. This help is timely and location-wise. If after a period of time or in a new location, the user forgets the correct operational procedure for a conditional command, the pertinent operation guides and/or help will be displayed when the conditional command is invoked as if it understands the user's thought. The human-machine interface built with embodiments of the invention provides timely, location-wise, thoughtful and pertinent help during use. FIG. 1 shows the flow chart for the technical scheme of conditional commands in software and their programming approach according to an embodiment.

Figure 2:
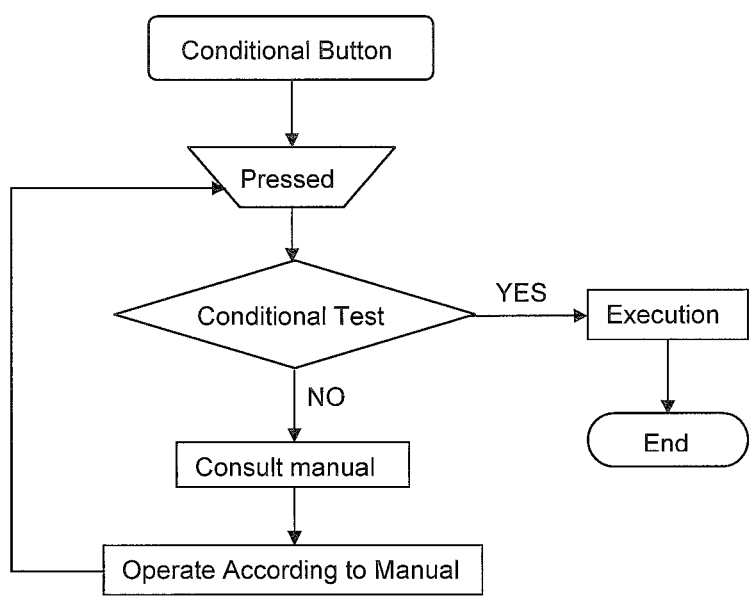
FIG. 2 is the flow chart for conditional buttons according to an embodiment of the invention.

Conventionally, conditional buttons for electronic appliances are effective only after some other related button has been depressed, otherwise conditional button will not have any effect if pressed when conditions for their execution are not satisfied. Embodiments of the invention embed conditional test for execution of the command for the conditional button, intelligent operation guides that activate depending on different situations of the user's operational situation and/or the working status of the electronic appliance and the conditional test or status check for different situations if there are more than one situations. The operation guides will be displayed if conditional buttons are pressed when the operational conditions are not satisfied, thereby providing pertinent help. The command for the conditional button will be executed directly if it is pressed when its operational conditions are satisfied. Thus intelligent and pertinent help is provided when needed without the need to consult user manuals, while direct execution of the command will proceed if the user knows how to operate the conditional button and operates accordingly. FIG. 2 shows the flow chart for the technical scheme for conditional buttons in electronic appliances and their programming approach in an embodiment.

Embodiments can be implemented in software or by hardware and software combined. An embodiment will be given in the following section for conditional commands in software for computers and other electronic appliances and for conditional buttons in electronic appliances, respectively.

For the embodiment of conditional commands in software for computers and other electronic appliances, take the "Group Properties" command in drawing and image processing software as an example. If the user wants to change the properties of a certain drawing group, firstly there must be drawing groups of objects created in a current document. Secondly the drawing group whose properties are to be changed must be selected. Conventionally, if there are no drawing groups selected, the "Group Properties" command will be "Grayed" and de-activated. Users have to consult the user manual or the help system to find out how to change group properties and/or how to create drawing groups among a vast amount of information. This approach is troublesome, time-consuming and sometimes futile.

Figure 3:
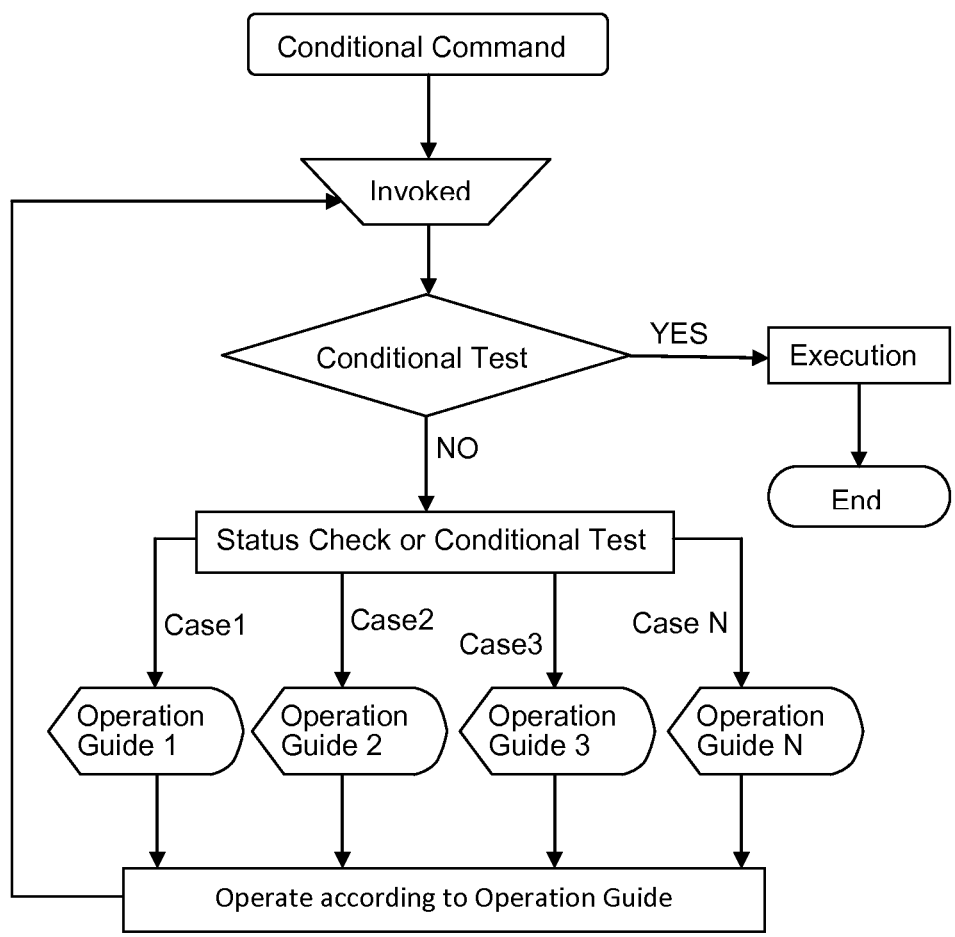
FIG. 3 is the flow chart for a "Group Properties" conditional command in drawing software as an example embodiment.

FIG. 3 shows the flow chart for the technical scheme of the "Group Properties" command for an embodiment. The "Group Properties" command is not updated by a command update system and is always activate for operation. When this command is invoked by the user, the program flows into a conditional test: "Are there drawing groups selected?"; if "YES", the condition is satisfied, the Group Property dialog box or property sheet is displayed for the user to modify the group properties of the selected drawing group or groups. If "NO", i.e., conditions are not satisfied, the command cannot be executed directly, the program then flows to another conditional test (or a document state check): "Are there any drawing groups in the current document?" If "YES", operation guide "Select one or more drawing groups and then invoke the 'Group Properties' command." is displayed; if "NO", another operation guide "Select drawing elements for a drawing group and execute the 'Build Drawing Group' command under the 'Edit' menu to create a drawing group and then select the created drawing group and invoke the 'Group Properties' command." is displayed. Users proceed according to the operation guides and then invoke the "Group Properties" command again. "Are there drawing groups selected?" test will then be satisfied and the command is executed directly. See FIG. 3.

The pseudo-code for the current embodiment is as follows:

```
GroupProperties( )
{
    If <Drawing Group or Groups Selected>
    {
    Display Group Property Dialog Box or Property Sheet, User Makes
    Modification and End.
    }
    Else
    {
        If <There Are Drawing Groups in Document>
        {
            Display Operation Guide "Select one or more drawing groups then
            invoke 'Group Properties' command."
        }
        Else
        {
            Display Operation Guide "Select drawing elements for a drawing
            group and execute the 'Build Drawing Group' command under
            the 'Edit' menu to create a drawing group and then select the
            created drawing group and invoke the 'Group Properties'
            command."
        }
    }
}
```

Another equivalent pseudo-code for the current embodiment is as follows:

```
GroupProperties( )
{
    If <Drawing Group or Groups Selected>
    {
    Display Group Property Dialog Box or Property Sheet, User Makes Modification and
    End.
    }
    Else If <There Are Drawing Groups in Document>
    {
        Display Operation Guide "Select one or more drawing groups then invoke 'Group
        Properties' command."
    }
    Else
    {
        Display Operation Guide "Select drawing elements for a drawing group and execute
        the 'Build Drawing Group' command under the 'Edit' menu to create a drawing
        group and then select the created drawing group and invoke the 'Group Properties'
        command."
    }
}
```

Figure 4:
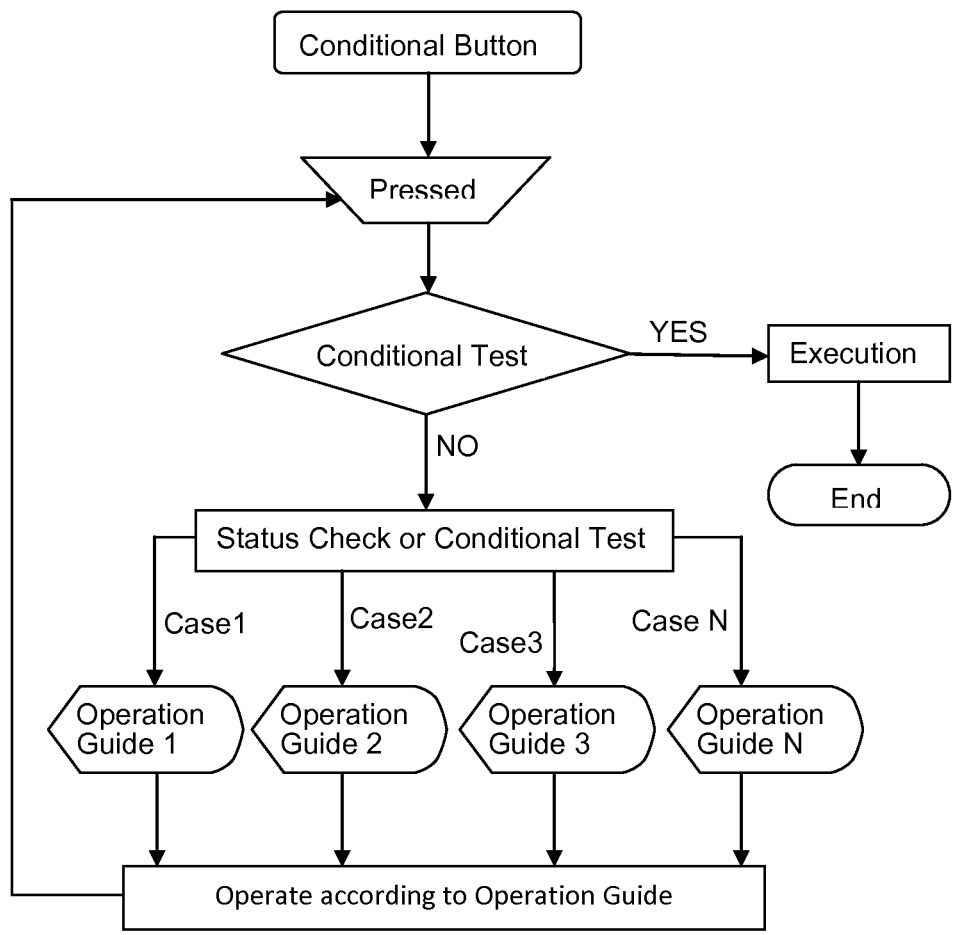
FIG. 4 is the flow chart for a "Channel Selection" conditional button in multi-purpose remote control as an example embodiment.
Figure 5:
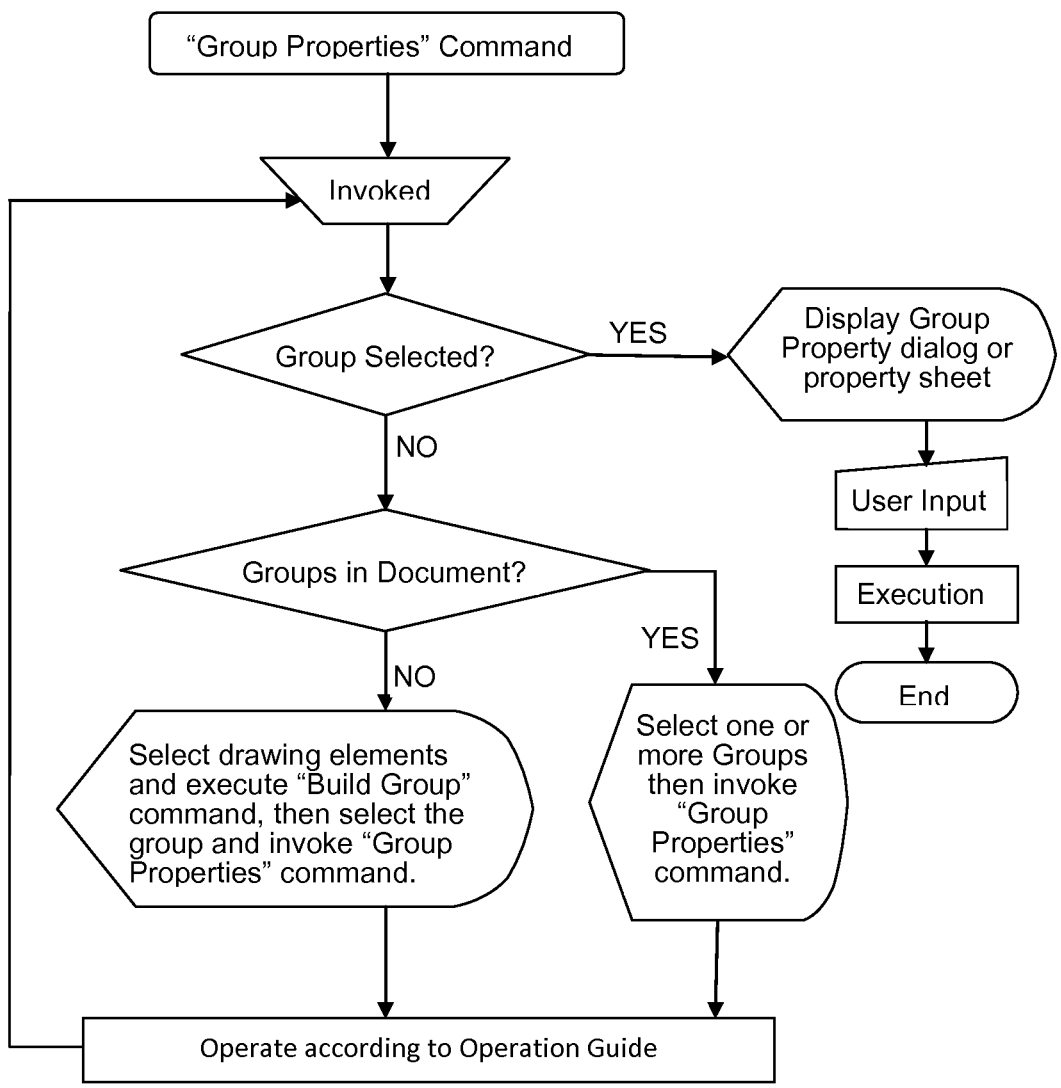
Figure 6:
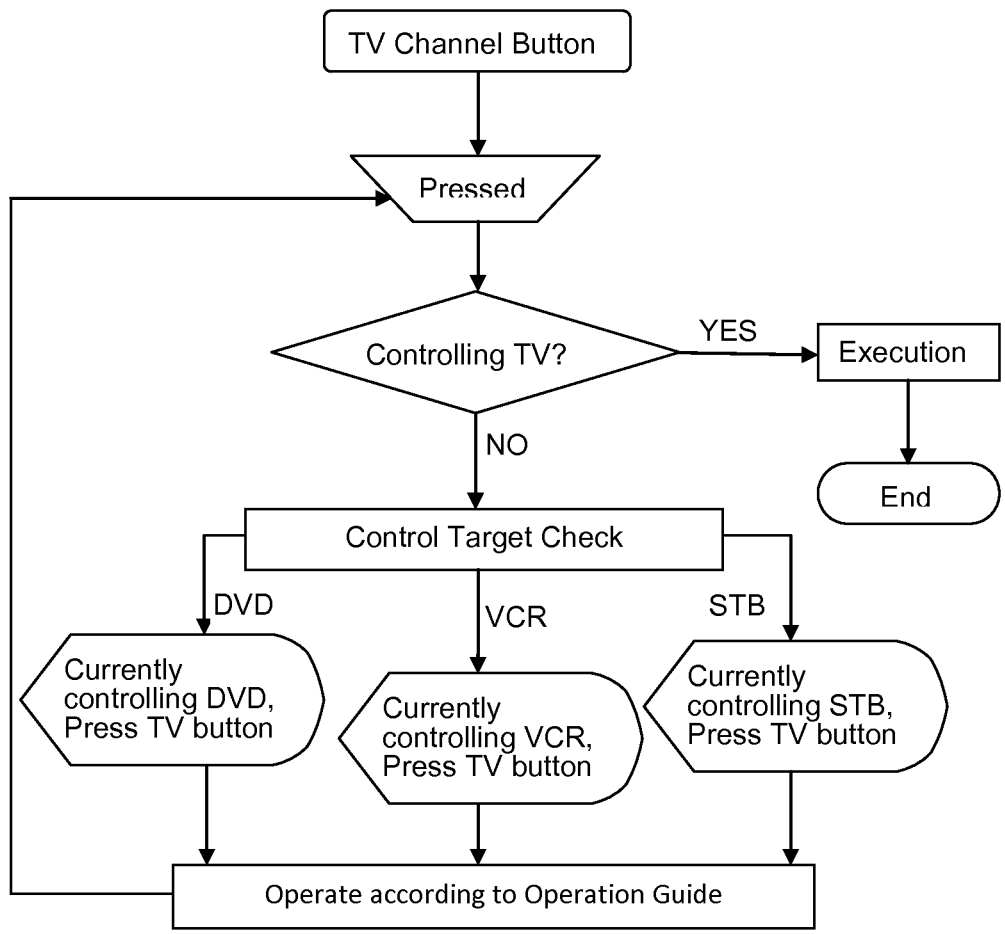

In an embodiment of conditional buttons in electronic appliances: take TV channel selection buttons on a remote control which can be used to control TV, DVD, VCR and STB (Set Top Box) as an example. This type of remote control is equipped with control target selection buttons, i.e., the TV, DVD, VCR and STB buttons. If a user unintentionally presses or hits the DVD, VCR or STB buttons when watching TV, the TV channel selection buttons will not react when the user wants to change channel. Under such circumstances, it is very difficult for the user to find out why the TV channel selection buttons suddenly ceased working. Embodiments of the present invention can solve this problem. Refer to FIG. 4 for a flow chart of the technical scheme from an embodiment for the TV channel selection buttons. When the user presses down the TV channel selection buttons, the program first checks whether the remote control is currently set for controlling the TV; if "YES," the TV channel is changed directly; if "NO," the program then checks the current control target of the remote control and displays control target description and operation guide according to the current control target. The user can then operate according to the operation guide to change the TV channel. See FIG. 4.

The pseudo-code for the current embodiment of the TV channel selection buttons is as follows:

```
TVChannelSelection( )
{
  If <Control target is TV>
  {
  Change channel accordingly.
  }
  Else
  {
    Switch (Control Target)
    {
    Case DVD:
    Display "The remote control is set to control DVD, press the TV button to control TV."
    Case VCR:
    Display "The remote control is set to control VCR, press the TV button to control TV."
    Case STB:
    Display "The remote control is set to control STB, press the TV button to control TV."
    }
  }
}
```

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The present invention offer pertinent help information for users in a timely, location-wise and thoughtful manner by use of embedded help, providing pertinent descriptions, operation guides and/or help. Software or hardware-software system created with embodiments of the present invention cannot only be used directly without any need for training, but can also generate ever increasing user proficiency. If users forget operation procedures for certain conditional commands or buttons, the software or system can provide timely and pertinent guides, simplifying the learning and using of software. This greatly augments the ease of use for computer and electronic appliances.

I claim:

1. A method, comprising:
   receiving a conditional command or the command of a conditional button from a user interface in an application program for a computer or other electronic appliance or in an electronic appliance; wherein the command is activated or enabled for execution even when the condition for its execution is not met;
   performing a conditional test embedded in the command to determine if the condition for executing the command is met;
   displaying automatically help embedded in the command and pertinent to a current situation, according to a status check or conditional test embedded in the command if there are more than one situations, if the condition is not met; and
   executing the command if the condition is met.

2. The method of claim 1, wherein the user interface includes keyboards with conditional buttons on electronic appliances.

3. The method of claim 1, wherein the user interface includes graphical user interfaces for computers or other electronic appliances.

4. The method of claim 1, further comprising a status check or conditional test or status checks or conditional tests embedded in the command for a plurality of situations if there are more than one situations and wherein the displaying displays help embedded in the command and pertinent to the current situation according to a status check or conditional test.

5. The method of claim 4, wherein the status checks or conditional tests include a status check or conditional test on a working status of an electronic device.

6. The method of claim 4, wherein the status checks or conditional tests include a status check or conditional test on a current document status.

7. The method of claim 4, wherein the status checks or conditional tests include a status check or conditional test on a user's operational status.

8. A non-transitory and tangible computer-readable storage medium having stored thereon instructions to cause a computer or other electronic device to execute a method, the method comprising:
   receiving a conditional command or the command of a conditional button from a user interface in an application program for a computer or other electronic appliance or in an electronic appliance; wherein the command is activated or enabled for execution even when the condition for its execution is not met;
   performing a conditional test embedded in the command to determine if the condition for executing the command is met;
   displaying automatically help embedded in the command and pertinent to a current situation, according to a status check or conditional test embedded in the command if there are more than one situations, if the condition is not met; and
   executing the command if the condition is met.

9. The computer-readable storage medium of claim 8, wherein the user interface includes keyboards with conditional buttons on electronic appliances.

10. The computer-readable storage medium of claim 8, wherein the user interface includes graphical user interfaces for computers or other electronic appliances.

11. The computer-readable storage medium of claim 8, wherein the method further comprising a status check or conditional test or status checks or conditional tests embedded in the command for a plurality of situations if there are more than one situations and wherein the displaying displays help embedded in the command and pertinent to the current situation according to a status check or conditional test.

12. The computer-readable storage medium of claim 11, wherein the status checks or conditional tests include a status check or conditional test on a working status of an electronic device.

13. The computer-readable storage medium of claim 11, wherein the status checks or conditional tests include a status check or conditional test on a current document status.

14. The computer-readable storage medium of claim 11, wherein the status checks or conditional tests include a status check or conditional test on a user's operational status.

* * * * *